United States Patent
Daenen et al.

(10) Patent No.: US 10,402,430 B2
(45) Date of Patent: Sep. 3, 2019

(54) METHOD AND SYSTEM FOR REPRESENTING PATHS ON A GRAPH BASED ON A CLASSIFICATION

(71) Applicant: Alcatel Lucent, Nozay (FR)

(72) Inventors: Koen Daenen, Haacht (BE); Dennis Dams, Hedel (NL)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 14/299,785

(22) Filed: Jun. 9, 2014

(65) Prior Publication Data

US 2015/0356166 A1    Dec. 10, 2015

(51) Int. Cl.
*G06F 17/30* (2006.01)
*G06F 16/28* (2019.01)

(52) U.S. Cl.
CPC .................. *G06F 16/287* (2019.01)

(58) Field of Classification Search
CPC ......... G06F 17/30601; G06F 17/30958; G06F 16/287
USPC .......... 707/716, 737, 738, 791, 798
See application file for complete search history.

(56) References Cited

U.S. PATENT DOCUMENTS

| | | | |
|---|---|---|---|
| 7,512,612 B1 * | 3/2009 | Akella | G06F 17/30958 |
| 8,126,926 B2 * | 2/2012 | Atre | G06F 17/30554 |
| | | | 707/798 |
| 8,745,054 B1 * | 6/2014 | Hsu | G06F 17/30716 |
| | | | 707/737 |
| 2003/0084054 A1 * | 5/2003 | Clewis | G06F 17/30958 |
| 2009/0064053 A1 * | 3/2009 | Crawford | G06T 11/206 |
| | | | 715/854 |
| 2010/0063973 A1 * | 3/2010 | Cao | G06F 17/30477 |
| | | | 707/758 |
| 2010/0332514 A1 * | 12/2010 | Steele | G06F 7/02 |
| | | | 707/769 |
| 2013/0218928 A1 * | 8/2013 | Kawamata | G06F 17/30958 |
| | | | 707/798 |
| 2013/0232174 A1 * | 9/2013 | Krajec | G06F 11/3604 |
| | | | 707/798 |
| 2013/0235040 A1 * | 9/2013 | Jackson, Jr. | G06T 11/206 |
| | | | 345/440 |
| 2014/0067873 A1 * | 3/2014 | Rosu | G06F 17/30958 |
| | | | 707/798 |
| 2014/0188946 A1 * | 7/2014 | Hartman | G06F 17/30958 |
| | | | 707/805 |

(Continued)

OTHER PUBLICATIONS

Cornelissen, Bas; Zaidman, Andy; Holten, Danny; Moonen, Leon; Van Deursen, Arie; and Van Wijk, Jarke J; Execution Trace Analysis Through Massive Sequence and Circular Bundle Views;Technical Report TUD-SERG 2008-008; Software Engineering Research Group, Delft University of Technology, The Netherlands, 2008, pp. 1-43.

(Continued)

*Primary Examiner* — Greta L Robinson
(74) *Attorney, Agent, or Firm* — Chiesa Shahinian & Giantomasi PC

(57) ABSTRACT

A system and method includes providing a graph having a plurality of paths from data. Each of the paths is classified into one of a plurality of classes based upon a criterion. Each of the paths are associated with indicia for representing paths of a class on the graph as being visually distinct from paths of another class on the graph.

17 Claims, 5 Drawing Sheets

(56) References Cited

U.S. PATENT DOCUMENTS

2014/0250140 A1* 9/2014 Guzenda ........... G06F 17/30958
707/758
2014/0372447 A1* 12/2014 Cheong ............. G06F 17/30958
707/741
2015/0026120 A1* 1/2015 Chrapko ................ G06Q 50/01
707/609

OTHER PUBLICATIONS

Fluxicon Disco; Process Mining and Automated Process Discovery Software for Professionals; http://www.fluxicon.com/disco/, downloaded Jun. 6, 2014, pp. 1-5.

* cited by examiner

METHOD AND SYSTEM FOR REPRESENTING PATHS ON A GRAPH BASED ON A CLASSIFICATION

BACKGROUND

A common technique for visualizing data, such as records or logs, is through a workflow diagram or flowchart, which can be abstractly represented as a graph. The data corresponding with the sequential actions of an individual case can be represented as paths on the graph. The paths on the graph can be condensed or compressed for analyzing characteristics of the graph. Conventionally, compressed paths are represented in the transitions (i.e., edges) of the graph by varying the thickness of the graph's transitions to reflect their frequency of occurrence in the dataset. This is helpful in judging the importance of individual steps in a session and identifying hot spots in the graph. However, properties of overall paths on the graph may be lost. More specifically, conventionally compressed paths of a graph may lose too much information to support comparison of certain actions.

SUMMARY

In one or more embodiments, systems, methods and computer program products provide models from data, such as logs or records. In one embodiment, the logs are a record of actions performed by a device interacting with a system. The data may be modeled as a graph having nodes representing actions or states and edges representing relationships between nodes. Sessions in the data (e.g., sequential logs of the same case) may be represented as paths in the graphs.

The paths of the graph may be classified into a plurality of classes. The classification may be based on any criterion. For example, the criterion may include one or more of: the success of the case (for any criteria of success), abandonments in the path, loopbacks in the path, repeated actions in a path, whether the session is a repeat case or a unique case, a chosen sub-process alternative at a certain point, a particular action performed in a path, a duration (e.g., 5 minutes, 20 minutes, one hour, over one hour, etc.), a level of resource usage (e.g., cost), etc.

Each path may be associated with indicia for indicating that paths of a class on the graph are represented as being visually distinct from paths of other classes on the graph. The paths may then be displayed (e.g., on a display) according to their respective indicia. For example, paths may be represented on the graph as having a different color than paths of another class. In one embodiment, the graph may be a class-extended graph having paths individually represented on the underlying graph by color according to class. In another embodiment, the graph may be a class-extended summary graph having paths condensed and represented in the lines of the nodes and/or edges of the underlying graph by color according to class. In this embodiment, lines of the nodes and/or edges may be associated with indicia indicating a weight of the nodes and/or edges represented in a thickness of the lines of the nodes and/or edges. The weight may be based on, e.g., a frequency of occurrence of an edge in a path, a frequency of occurrence of a node in a path, a frequency of occurrence that a node appears as an endpoint (or start point) of a particular edge (e.g., the first or last edge in the path), etc.

These and other advantages will be apparent to those of ordinary skill in the art by reference to the following detailed description and the accompanying drawings.

DETAILED DESCRIPTION

Figure 1:
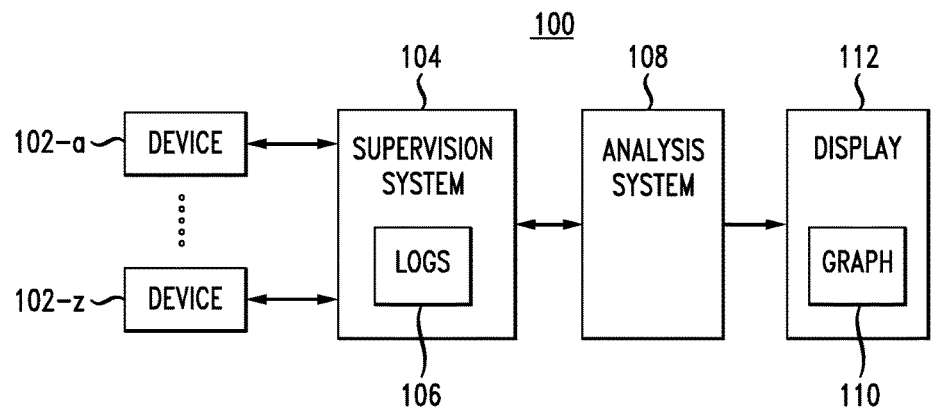
FIG. 1 shows a high-level overview of an exemplary system for representing paths on a graph by classification.

FIG. 1 shows a high-level overview of an exemplary system 100 for representing paths on a graph by classification, in accordance with one or more embodiments. It should be understood that path representation by classification is not limited to system 100 of FIG. 1; path representation by classification can be performed in other contexts or applications as well.

System 100 includes one or more devices 102 connected to a network to interact with supervision system 104. Devices 102 are connected by any communication system, such as, e.g., the Internet, a wired and/or wireless computer network, a cellular network, a bus connection (e.g., universal serial bus), etc. Devices 102 are shown having devices 102-a to 102-z; however it should be understood that devices 102 may include any number of devices. Devices 102 may include any computing device able to interface with the communication system, such as, e.g., a computer, a laptop, a mobile phone, a tablet, etc. Devices 102 may act fully autonomously or may act under the control of one or more users interacting with devices 102.

Supervision system 104 generates logs 106 of actions performed by devices 102 interacting with supervision system 104, as well as logs of the coordination actions and decisions taken by the supervision system 104 itself. In one embodiment, supervision system 104 may be a diagnostic and troubleshooting system, which is accessed by devices 102 for troubleshooting (e.g., self-help troubleshooting). In this embodiment, supervision system 104 performs the following tasks: monitors the network for devices 102 that report a problem, opens a case by assigning a unique case identifier to the reported problem and initiating logging, instantiates a case handling process (e.g., ask a question to devices 102, send a technician, query or update a device, etc.), and closes the case which generates a closing step record in the log. It should be understood that supervision system 104 may include any system that generates logs 106 and is not limited to a diagnostic and troubleshooting system.

Analysis system 108 generates models based on logs 106. In one embodiment, logs 106 can be modeled as a business process model, a workflow diagram, a flowchart, etc., which can be abstractly represented as a graph having nodes representing actions and edges representing a relationship between two nodes. Sessions, which represent a sequence of performed events in logs 106, are represented as paths (or traces) on or through the underlying graph. Sequences may be defined according to a common identifier associated with entries in the logs 106, e.g., report ID or session ID. Analysis system 108 classifies the paths according to one or more criteria (e.g., success/failure, resource usage, etc.). Each path is stored in memory associated with one or more indicia indicating how the paths are to be visualized (e.g., line color, thickness, style, etc.) based on the classification. By classifying the paths, display 112 can represent graphs 110 (e.g., class-extended graph, class-extended summary graph, etc.) according to the indicia having paths of different classes being visually distinct (e.g., by color) from each other. This is helpful to identify differences between paths of different classes. Analysis system 108 is discussed in more detail below with respect to FIG. 3.

Figure 2A:
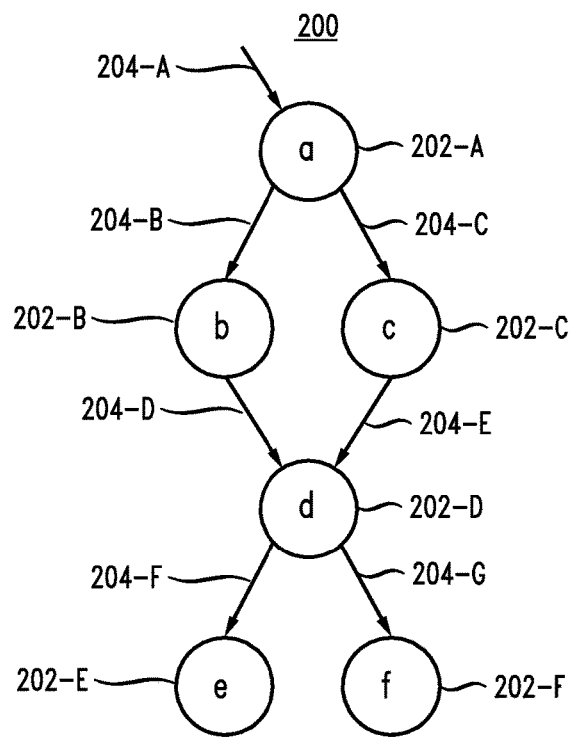
FIG. 2A shows an exemplary graph having nodes and edges.

FIG. 2A shows an exemplary graph 200 in accordance with one or more embodiments. In one embodiment, logs 106 of FIG. 1 are modeled as graph 200. Graph 200 can be represented as a tuple G=(N,E) where N is a set of nodes 202-A through 202-F and E is a set of edges 204-A through 204-G. It should be understood that graph 200 may include any number of nodes 202 and edges 204. Nodes 202 may represent, e.g., an action, state, location, etc. while edges 204 may represent a relationship between two nodes 202. In one embodiment, graph 200 may be a directed graph, where its edges 204 are directed (e.g., when representing a transition or move between two nodes). As shown in directed graph 200 of FIG. 2A, edges 204 are represented as arrows indicating its direction. Graph 200 starts with node 204-A, then proceeds to either node 202-B or 202-C, then goes to node 202-D, then ends with either node 202-E or 202-F.

Figure 2B:
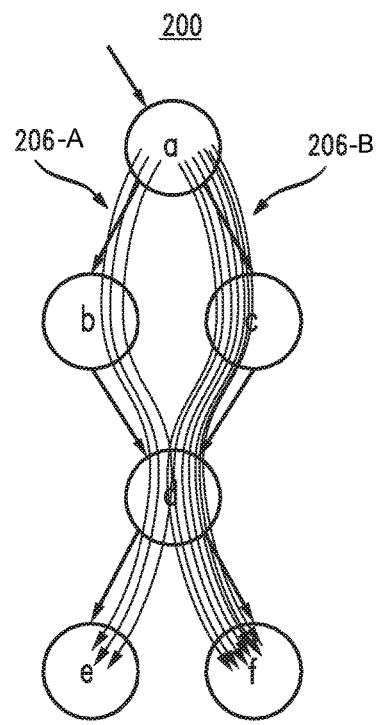
FIG. 2B shows an exemplary graph having paths represented thereon.

FIG. 2B shows graph 200 having paths 206-A and paths 206-B represented thereon, in accordance with one or more embodiments. Paths 206-A and paths 206-B include the nodes that are traversed through the graph 200, as well as additional attributes that distinguish the path from other paths that may follow the same trajectory. For example, those attributes may relate to the workflow session that resulted in the path. Sequences representing a set or subset of nodes and edges that can be associated with a single instance or session may be defined based on a common identifier. The visualization of paths 206-A and paths 206-B on top of graph 200 may be helpful for analysis because it shows the path in the context in which its actions occurred. For example, besides the path being visualized, the alternative paths that were not taken can be easily determined. Multiple paths may be shown all together over a single graph 200 in this way. However, graph 200 may have a very large number of paths 206-A and paths 206-B, causing the visualization to become cluttered and difficult to read.

Figure 3:
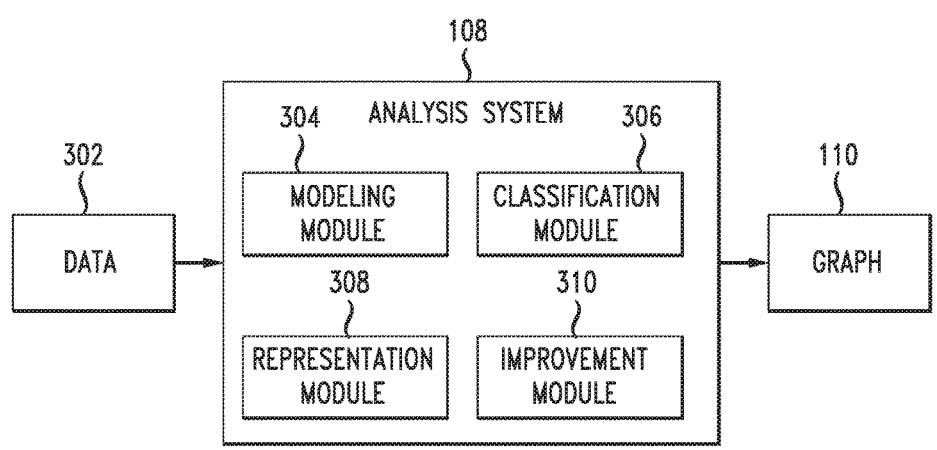
FIG. 3 shows a detailed view of an analysis system for representing paths on a graph by classification.

FIG. 3 shows a detailed view of analysis system 108 in accordance with one or more embodiments. Analysis system 108 receives data 302, which may include logs (e.g., logs 106), step reports, records or any other suitable type of data. Modeling module 304 provides a model based on data 302. In one embodiment, modeling module 304 generates a model based on data 302 using any suitable method, such as, e.g., process mining. Data 302 can be modeled as a flowchart, a business process model, a sequential workflow, etc., which can be abstractly represented as a graph G. The graph G may be a directed graph (e.g., graph 200).

In another embodiment, modeling module 304 receives a predefined model of data 302. In this embodiment, modeling module 304 correlates the information in data 302 with the predefined graph. For example, each step record in data 302 is correlated with a node on the graph based on a name, identifier, or any other property or combination of properties.

A set of paths P is identified on the graph G from data 302 as sequences of successive edges. A sequence represents a set or subset of nodes and edges that can be associated with a single instance or session, such as, e.g., a single troubleshooting case opened in supervision system 104 of FIG. 1. The sequence can be identified based on the order of entries, a timestamp, a sequence number or any other identifier in data 302. For example, entries in data 302 forming a sequence may share a common identifier, such as a report ID, session ID or any other identifier. In one embodiment, the graph G generated from data 302 is graph 200 of FIGS. 2A and 2B having paths 206.

Classification module 306 classifies each path from the set of paths P. Classifications are often domain specific and may be based on any criterion or combination of criteria. For example, the criterion may include one or more of: the success or failure of the path, the level of success (e.g., excellent, satisfactory, unsatisfactory, bad based on any criterion), whether the path was aborted or abandoned, loopbacks in the path where the action returns to a previous interaction, repeated actions in a path, whether the case is a repeat case or a unique case (e.g., the first X steps are the same, X % of the steps are the same, commonality in cases (related to the same subscriber, related to the same type of issue, etc.), an external source (e.g., the reporting subscriber) defines the case as a repeat, cases are created within a certain time window), a chosen sub-process alternative at a certain point, a particular action performed in a path, an occurrence of a particular transition from one action to another, a duration (e.g., 5 minutes, 20 minutes, one hour, over one hour, etc.), a level of resource usage (e.g., cost), etc. In another embodiment, a person, object, and/or event may be correlated to the session and used as the criterion. For instance, a subscriber, device, day of the week, weather, or any other characteristic can be used as the criterion. In one example, the subscriber that is calling has a certain account profile (e.g., prepaid versus subscription) that can be used as the criterion. In another example, a property of the battery in the mobile device that he is using (e.g., whether it can be replaced or not) can be used as the criterion. Other criterion may also be employed.

In one embodiment, the criteria are selected by a user. In other embodiments, the criteria are automatically selected by classification module 306. For example, classification module 306 may automatically select the criteria by randomly selecting the criteria, iterating through a pre-defined ordered set of classifications, etc. Based on the selected criteria or combination of criterion, classification module 306 determines a set of classes C. For example, where the classification is {success, failure}, the classes c in the set of classes C include the class success and the class failure. In another example, where the classification is {success, failure} and {short-duration, long-duration}, the combined classes may include {success+ short-duration, failure+ short-duration, success+ long-duration, failure+ long-duration}. Classification module 306 maps each path p in the set of paths P to a class c.

Based on the classification, representation module 308 associates each path with one or more indicia indicating how the paths are to be visualized (e.g., on display 112). Specifically, in one embodiment, the paths on the graph are associated with indicia for representing paths as being visually distinct (e.g., when displayed on display 112) from each other according to its class, e.g., by color, style, etc. For example, in one embodiment, the graph may be a class-extended graph displayed on display 112 having individual paths associated with indicia indicating that the paths are represented on display 112 as being visually distinct from paths of other classes by color. In another embodiment, the graph may be a class-extended summary graph displayed on display 112 having paths represented by the lines of the edges and/or nodes of the underlying graph, where the paths are associated with indicia indicating that the paths are represented on display 112 as being visually distinguished from paths of other classes by color according to its class and by weight according to line thickness.

As noted above, in one embodiment, the graph may be a class-extended graph. The class-extended graph includes the graph (i.e., the underlying graph), a set of paths through the graph, and a path classification mapping each path from the set to a class. In the class-extended graph, the underlying graph is visualized with the individual paths overlaid on top of it, where each path is associated with indicia that indicate its class. The indicia provide a visual distinction between paths of different classes (e.g. by color).

In another embodiment, the graph may be a class-extended summary graph. A class-extended summary graph is a compressed representation with respect to a given class-extended graph, aimed at reducing the (visual) clutter that may occur in the class-extended graph. A class-extended summary graph can be thought of as being constructed starting from a given class-extended graph. However, instead of overlaying the individual paths on the underlying graph, the paths are reflected in the underlying graph itself by associating weights to the edges (and/or nodes) of the underlying graph. The lines of the edges and/or nodes are associated with indicia indicating, e.g., the thickness of the lines of the edges and/or nodes based on the weight. Each edge in the underlying graph is associated with multiple counters: one for each class. Similar implementations can be applied for nodes.

The class-extended summary graph may be constructed by first constructing a new graph for each class having weighted nodes and/or edges. Each graph is identical in terms of its nodes and edges. Only the associated class and weights are different. When a new path is added, only the graph for the applicable class (or classes) is updated by updating the weights. Once all paths p in the set of paths P are classified, the graphs are merged to form the class-extended summary graph. In one embodiment, the weights used to represent the counter value are scaled based on, e.g., the total number of paths.

The weight may be based on any criteria, such as, e.g., a frequency of instances or occurrences in a path using a counter. For example, the counter may increment each time a given edge appears in the paths. In another example, the counter may increment each time a given node appears in the paths. However, this approach may yield redundant information compared to the counter of the edge. In another example, the counter may increment each time a given node appears as a start point or an endpoint of an edge (e.g., any edge, an edge that was present in the original workflow definition, an edge that deviates from the original workflow, etc.) in the paths. This approach may be useful when paths do not always end on the same exit node. Other forms of weighting may also be employed.

Improvement module 310 updates the classification based on previously generated graphs to provide graph 110, which may be a class-extended graph or class-extended summary graph. Improvement module 310 looks at the effect of the visualization of the graph for potential improvements. For example, a classification that distinguishes two (or more) classes which are not significantly different can be used to highlight explicit similarity between these classes. However, a classification which does not distinguish paths hides useful information. The best case is to find a classification that is either distinct or merges classes to end up with a minimal amount of different classifications (e.g., colors) that still highlight the most important differences. Improvement module 310 implements improvements to the graph by employing different criteria for classification. This may be done manually via user interaction to select a different classification, or automatically (e.g., randomly selecting a classification, iteratively selecting a next classification, etc.). Employing different criteria for classification may include combinations of criteria. In one embodiment, a classification is selected resulting in a high number of classes to obtain a data rich (though complex) view as a start. After analysis, classes are consolidated to create a more simplistic view.

Figure 4B:
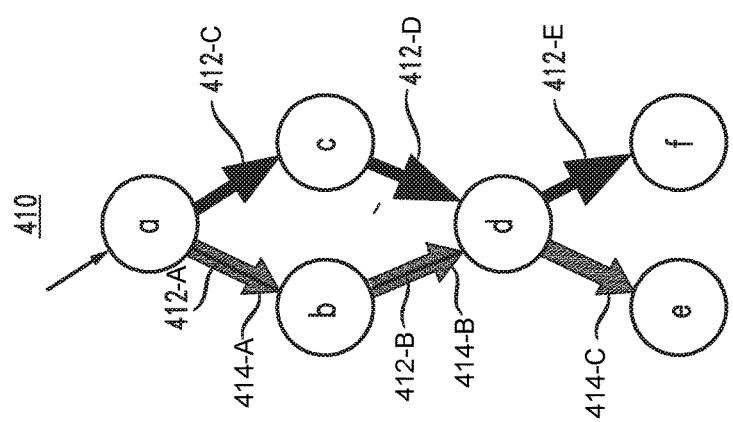
FIG. 4B shows an exemplary class-extended summary graph with paths represented in the lines of the edges being visually distinguished by class.
Figure 4A:
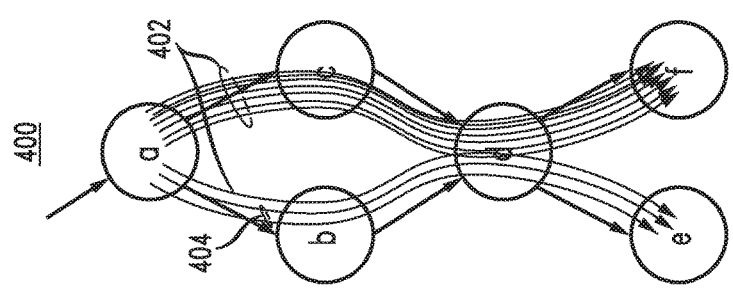
FIG. 4A shows an exemplary class-extended graph with paths thereon being visually distinguished by class.

FIG. 4A shows an exemplary class-extended graph 410 in accordance with one or more embodiments. In one embodiment, class-extended graph 400 is graph 110 of FIG. 3. Class-extended graph 400 shows individual paths over the underlying graph. The paths are associated with indicia that indicate its class to provide a visual distinction between paths of different classes. Each path in class-extended graph 400 is represented by a distinct color to form paths of a first class 402 and paths of a second class 404.

FIG. 4B shows an exemplary class-extended summary graph 410 in accordance with one or more embodiments. Class-extended summary graph 410 includes a compressed representation of the paths in the lines of the edges and nodes of the underlying graph. The weights are represented as counters for each class reflected in, e.g., the thickness of the lines of the edges and/or nodes. In one example, class-extended summary graph 410 can be visualized using colors to represent classes. The underlying graph is first displayed, where the per-color counters of each edge determine the color composition and the thickness of the edge. For example, if an edge has "blue-count" 20 and "red-count" 80, then the total thickness of the edge will be 20+80=100, and 20% of its area will be blue and 80% of its area will be red. FIG. 4B illustratively shows class-extended summary graph 410 having paths reflected in the edges of the underlying graph. The edges are associated with indicia that indicate the classes of the represented paths to provide a visual distinction between paths of different classes. In the example of FIG. 4B, each class is represented by a distinct color to represent paths 412-A, 412-B, 412-C, 412-D, and 412-E (collectively referred to herein as path 412) in edges for a first class and paths 414-A, 414-B, and 414-C (collectively referred to herein as paths 414) in edges for a second class.

Figure 4C:
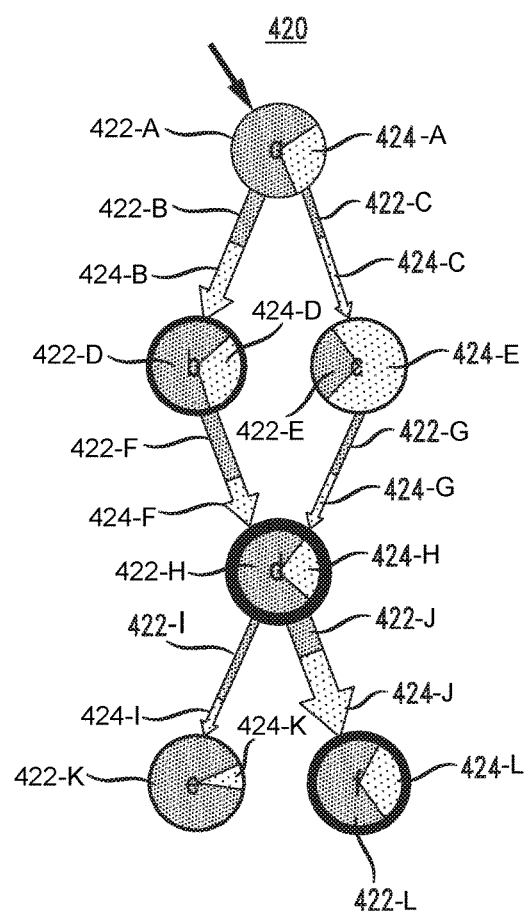
FIG. 4C shows an exemplary class-extended summary graph with paths represented in the lines of the edges and nodes being visually distinguished by class.

It should be understood that while class-extended summary graph 410 is represented having paths 412 and 414 represented in the edges as being visually distinguished by color along the length of the edges, other approaches for representing paths 412 and 414 as visually distinct are also contemplated. For example, FIG. 4C shows an exemplary class-extended summary graph 420 where both edges and nodes are used to represent paths. Class-extended summary graph 420 includes portions 422-A through 422-L (collectively referred to herein as portions 422) of lines of edges and nodes of the underlying graph representing paths of a first class and portions 424-A through 424-L (collectively referred to herein as portions 424) of lines of edges and nodes of the underlying graph representing paths of a second class. Portions 422 and 424 are associated with indicia that indicate its class (e.g., by color, pattern, style, etc.). The line thickness of the nodes represents weight as indicated by the counter of paths ending at the given node. For example, when the counter is zero, a line thickness of 0 is applied to the line of the node. Other approaches to associate the counter with the line of the nodes are also contemplated (e.g., dotted or dashed lines).

It is noted that class-extended graph 400, class-extended summary graph 410, and class-extended summary graph 420 may be represented having hidden (i.e., non-visible) edges. Edges can be determined as visible or hidden based on any criteria. Otherwise, graphs 400 and 410 would appear with too many edges, making it difficult to a viewer to interpret any meaningful results from the graphs. While modelling, classifying, and/or mapping paths on the graph, it is important to consider all possible edges, visible and hidden. Advantageously, class-extended graph 400, class-extended summary graph 410, and class-extended summary graph 420 include more information than a summary graph having no classification information. By recording the classes of paths, it re-introduces some information about how edges from the underlying graph are chained together into paths. This allows the detection of temporal patterns and dependencies that might otherwise go unnoticed.

Figure 5:
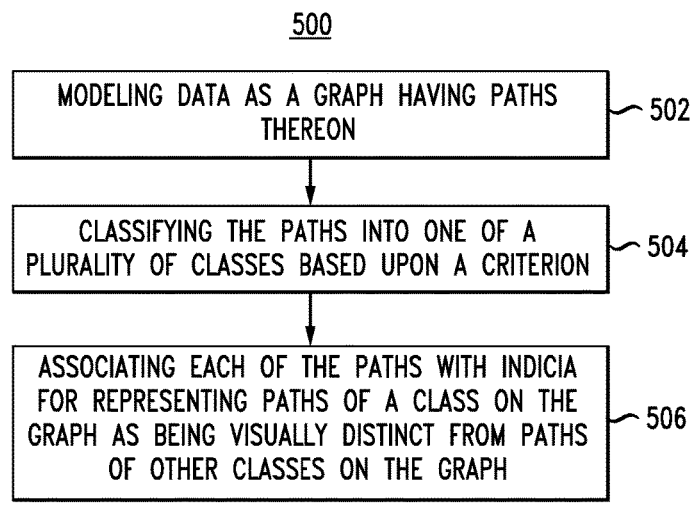
FIG. 5 is a flow diagram of a method for representing paths on a graph by classification.

FIG. 5 shows a flow diagram of a method 500 for representing paths on a graph by classification, in accordance with one or more embodiments. At step 502, data is modeled as a graph having paths thereon. The graph may be generated from the data by, e.g., process mining, or the model may be predefined. The data may include logs, step reports or other forms of data. The graph includes nodes representing actions, stages, etc. and edges representing a relationship between nodes. The representation also includes a plurality of paths represented over the graph.

At step 504, paths are classified into one of a plurality of classes based upon a criterion. The criterion may include one or more of the success or failure of the path, whether the path was aborted or abandoned, loopbacks in the path where the action returns to a previous interaction, repeated actions in a path, whether the case is a repeat case or a unique case, a chosen sub-process alternative at a certain point, a particular action performed in a path, a duration (e.g., 5 minutes, 20 minutes, one hour, over one hour, etc.), a level of resource usage (e.g., cost), etc. The criterion may be user-selected or automatically selected (e.g., randomly, iteratively, etc.).

The graph, as produced at step 506, may be a class-extended graph having individual paths shown over the underlying graph or may be a class-extended summary graph showing a compressed representation of the paths in the lines of the edges and/or nodes. Where the graph is a class-extended summary graph, the lines of the nodes and/or edges are weighted in accordance with a counter. In another embodiment, the weight may be represented by the frequency of occurrence of a given node in a path. In another embodiment, the weight may be represented by the frequency of occurrence that a given node appears as a start point or endpoint of a particular edge in a path. Other forms of weighting are also contemplated.

At step 506, paths of a class are associated with indicia, which indicate how the paths are to be visually represented (e.g., on a display). The paths of a class may be associated with indicia indicating that the paths are represented on the graph as being visually distinct from paths of other classes on the graph. Paths of different classes may be visually distinguished, e.g., by color, style, thickness, etc. In one embodiment, paths of different classes are visually distinguished by employing different colors. For example, a class-extended graph includes individual paths displayed as a flow over the graph having different colors for different classes, such as, e.g., in class-extended graph 400 in FIG. 4A. In another embodiment, paths of different classes and weights are represented in a class-extended summary graph. For example, paths may be represented by the lines of the nodes and/or edges such that different colors in the lines represent different classes of paths and a thickness of the lines represents the weight, such as, e.g., in class-extended summary graph 410 in FIG. 4B and class-extended summary graph 420 in FIG. 4C. Other approaches for visually distinguishing classes may also be employed. The graph may be improved by reclassifying the paths based on different criterion, e.g., based upon user interaction.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 5. Certain steps of the methods described herein, including one or more of the steps of FIG. 5, may be performed by a server or by another processor in a network-based cloud-computing system. Certain steps of the methods described herein, including one or more of the steps of FIG. 5, may be performed by a client computer in a network-based cloud computing system. The steps of the methods described herein, including one or more of the steps of FIG. 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
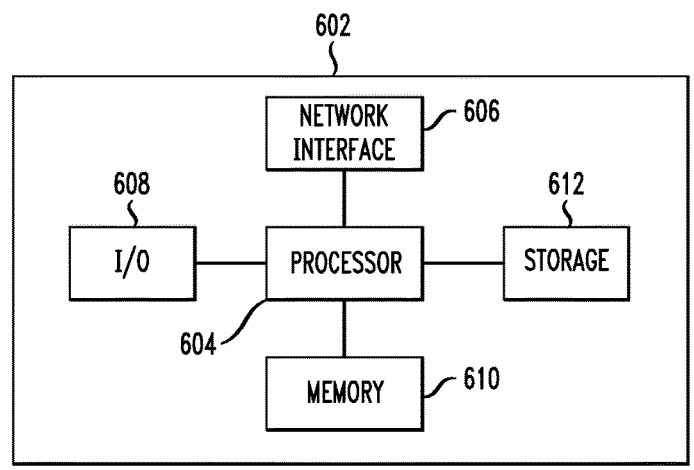
FIG. 6 depicts a high-level block diagram of a computer for compressing paths on a graph by classification.

A high-level block diagram of an example computer that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method steps of FIG. 5 can be defined by the computer program instructions stored in memory 610 and/or data storage device 612 and controlled by processor 604 executing the computer program instructions. For example, the computer program instructions can be implemented as computer executable code programmed by one skilled in the art to perform the method steps of FIG. 5. Accordingly, by executing the computer program instructions, the processor 604 executes the method steps of FIG. 5. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

Any or all of the systems and apparatus discussed herein, including systems 100 and 108, may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method, comprising:
providing a graph associated with a plurality of paths;
associating, by a processor, each of the paths with one of a plurality of classes based on a criterion;
associating, by the processor, particular edges and nodes of the graph with indicia for representing each class associated with a path that passes though the particular edges and nodes; and
displaying the graph by the processor based on the indicia such that each respective class of the plurality of classes is represented as a thickness of each of the particular edges and nodes of the graph based on a frequency of occurrence of the paths associated with the respective class relative to a frequency of occurrence of the paths associated with each of the plurality of classes so that the plurality of classes are visually distinct from each other.

2. The computer-implemented method of claim 1 further comprising:
associating each of the paths with indicia for representing paths for each of the plurality of classes with different colors; and
wherein displaying the graph comprises displaying the graph having the plurality of paths overlaid thereon in accordance with the indicia for representing paths for each of the plurality of classes.

3. The computer-implemented method of claim 2 wherein displaying the graph further comprises:
displaying the plurality of paths as individual paths over the particular edges and nodes of the graph.

4. The computer-implemented method of claim 1 wherein the criterion comprises one or more of: success of the paths, abandonment of the paths, loopbacks in the paths, an action performed in the paths, a duration of the paths, and a level of resource usage of the paths.

5. The computer-implemented method of claim 1 further comprising:
weighting the particular edges and nodes of the graph based upon a frequency of occurrence of a node of the graph.

6. The computer-implemented method of claim 1 wherein displaying the graph comprises:

weighting the particular edges and nodes of the graph based upon a frequency of occurrence of a node of the graph appearing as an endpoint of an edge.

7. The computer-implemented method of claim 1 wherein displaying the graph comprises:

weighting the particular edges and nodes of the graph based upon a frequency of occurrence of an edge of the graph appearing in the paths.

8. The computer-implemented method of claim 1 wherein associating particular edges and nodes of the graph with indicia comprises:

associating lines of the particular edges and nodes of the graph with indicia for representing a weight of the particular edges and nodes as the thickness of the lines of the particular edges and nodes.

9. A computer readable medium storing computer program instructions, which, when executed on a processor, enable the processor to perform operations comprising:

providing a graph associated with a plurality of paths;

associating each of the paths with one of a plurality of classes based on a criterion;

associating particular edges and nodes of the graph with indicia for representing each class associated with a path that passes though the particular edges and nodes; and displaying the graph based on the indicia such that each respective class of the plurality of classes is represented as a thickness of each of the particular edges and nodes of the graph based on a frequency of occurrence of the paths associated with the respective class relative to a frequency of occurrence of the paths associated with each of the plurality of classes so that the plurality of classes are visually distinct from each other.

10. The computer readable medium of claim 9 the operations further comprising:

associating each of the paths with indicia for representing paths for each of the plurality of classes with different colors; and wherein displaying the graph comprises displaying the graph having the plurality of paths overlaid thereon in accordance with the indicia for representing paths for each of the plurality of classes.

11. The computer readable medium of claim 9 wherein the criterion comprises one or more of: success of the paths, abandonment of the paths, loopbacks in the paths, an action performed in the paths, a duration of the paths, and a level of resource usage of the paths.

12. The computer readable medium of claim 9 wherein the operation of associating particular edges and nodes of the graph with indicia comprises:

associating lines of the particular edges and nodes of the graph with indicia for representing a weight of the particular edges and nodes as the thickness of the lines of the particular edges and nodes.

13. An apparatus comprising:

a processor; and a memory to store computer program instructions, the computer program instructions when executed on the processor cause the processor to perform operations comprising:

providing a graph associated with a plurality of paths;

associating each of the paths with one of a plurality of classes based on a criterion;

associating particular edges and nodes of the graph with indicia for representing each class associated with a path that passes though the particular edges and nodes; and displaying the graph based on the indicia such that each respective class of the plurality of classes is represented as a thickness of each of the particular edges and nodes of the graph based on a frequency of occurrence of the paths associated with the respective class relative to a frequency of occurrence of the paths associated with each of the plurality of classes so that the plurality of classes are visually distinct from each other.

14. The apparatus of claim 13 the operations further comprising:

associating each of the paths with indicia for representing paths for each of the plurality of classes with different colors; and wherein displaying the graph comprises displaying the graph having the plurality of paths overlaid thereon in accordance with the indicia for representing paths for each of the plurality of classes.

15. The apparatus of claim 13 wherein the criterion comprises one or more of: success of the paths, abandonment of the paths, loopbacks in the paths, an action performed in the paths, a duration of the paths, and a level of resource usage of the paths.

16. The apparatus of claim 13 wherein displaying the graph comprises:

weighting the particular edges and nodes of the graph based upon a frequency of occurrence of a node of the graph.

17. The apparatus of claim 13 wherein displaying the graph comprises:

weighting the particular edges and nodes of the graph based upon a frequency of occurrence of an edge of the graph appearing in the paths.

* * * * *